US008363083B2

(12) United States Patent
Matsuura

(10) Patent No.: US 8,363,083 B2
(45) Date of Patent: Jan. 29, 2013

(54) LIGHT SOURCE DEVICE HAVING HOLDING MEMBER FOR HOLDING LIGHT-EMITTING ELEMENT AND COUPLING LENS FOR USE IN OPTICAL SCANNER

(75) Inventor: Taizo Matsuura, Ama (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 239 days.

(21) Appl. No.: 12/832,515

(22) Filed: Jul. 8, 2010

(65) Prior Publication Data

US 2011/0007125 A1 Jan. 13, 2011

(30) Foreign Application Priority Data

Jul. 8, 2009 (JP) ................................. 2009-161863
Jul. 8, 2009 (JP) ................................. 2009-161866

(51) Int. Cl.
*B41J 15/14* (2006.01)
*B41J 2/435* (2006.01)
(52) U.S. Cl. ....................................... 347/242; 347/224
(58) Field of Classification Search .................. 347/242; 348/340; 359/813; 369/116; 372/108, 36; 362/311; 315/291
See application file for complete search history.

(56) References Cited

U.S. PATENT DOCUMENTS

| 5,673,083 A * | 9/1997 | Izumi et al. ................... 348/340 |
| 5,689,378 A * | 11/1997 | Takashima et al. ............ 359/813 |
| 6,093,962 A | 7/2000 | Ikegame |
| 6,343,092 B1 * | 1/2002 | Naoe et al. .................... 372/108 |
| 7,940,440 B2 | 5/2011 | Nagaoka et al. |
| 2001/0004347 A1 * | 6/2001 | Koga et al. .................... 369/116 |
| 2002/0075916 A1 * | 6/2002 | Sato et al. ....................... 372/36 |
| 2008/0316559 A1 | 12/2008 | Nagaoka et al. |

FOREIGN PATENT DOCUMENTS

| JP | 11-126913 | | 5/1999 |
| JP | 11126913 | * | 5/1999 |
| JP | 11-213422 | | 8/1999 |
| JP | 2001-071553 | | 3/2001 |
| JP | 2001-177176 | | 6/2001 |

(Continued)

OTHER PUBLICATIONS

Decision of Grant for Patent for corresponding Japanese Patent Application No. 2009-161866 mailed on Nov. 8, 2011. Office Action received for corresponding Japanese Patent Application No. 2009-161863 mailed on Feb. 15, 2011.
Office Action received for corresponding Japanese Patent Application No. 2009-161866 mailed on Apr. 19, 2011.

*Primary Examiner* — Stephen D Meier
*Assistant Examiner* — Carlos A Martinez
(74) *Attorney, Agent, or Firm* — Banner & Witcoff, LTD.

(57) ABSTRACT

In a light source device, a light-emitting element and a coupling lens configured to condense a beam of light emitted from the light-emitting element are held by a holding member. The holding member has an adherend that is opposite to a surface of the coupling lens facing to the light-emitting element in a direction of an optical axis of the coupling lens. Part of the surface of the coupling lens facing to the light-emitting element is bonded to the adherend of the holding member. In the optical scanner which includes this light source device, a beam of light emitted from the light source device is deflected by a deflector so that a target surface is scanned with the beam of light, and the deflected beam of light is caused by an image forming optical system to focus on the target surface, to form an image thereon.

18 Claims, 9 Drawing Sheets

FOREIGN PATENT DOCUMENTS

| | | |
|---|---|---|
| JP | 2002-031773 | 1/2002 |
| JP | 2003-029180 | 1/2003 |
| JP | 2003-098413 | 4/2003 |
| JP | 2003-283031 | 10/2003 |
| JP | 2004-163607 | 6/2004 |
| JP | 2004-363360 | 12/2004 |
| JP | 2005-037560 | 2/2005 |
| JP | 2005037560 | * 2/2005 |
| JP | 2006-251013 | 9/2006 |
| JP | 2009-002986 | 1/2009 |

* cited by examiner

LIGHT SOURCE DEVICE HAVING HOLDING MEMBER FOR HOLDING LIGHT-EMITTING ELEMENT AND COUPLING LENS FOR USE IN OPTICAL SCANNER

CROSS-REFERENCE TO RELATED APPLICATION(S)

This application claims priority from Japanese Patent Application Nos. 2009-161863 and 2009-161866, filed on Jul. 8, 2009, the disclosures of which are incorporated herein by reference in its entirety.

BACKGROUND

1. Technical Field

Apparatuses consistent with the present invention relate to a light source device and an optical scanner.

2. Description of Related Art

In an image forming apparatus such as a laser printer, typically, an optical scanner is provided as a part of an optical system for forming an electrostatic latent image on a photoconductor. The optical scanner mainly comprises a light source device, a deflector and an image forming optical system. A beam of light emitted from the light source device is deflected by the deflector so that an outer peripheral surface of the photoconductor (a target surface) is scanned with the beam of light. The image forming optical system causes the beam of light deflected by the deflector to focus on the target surface to be scanned, to form an image thereon.

One example of such a light source device of the optical scanner, known in the art, includes a holding member for holding a light-emitting element such as a semiconductor laser, and a ledge or projection for mounting a coupling lens is provided at the holding member. The coupling lens in this example is located in place on the ledge and fixed thereon with an ultraviolet curing adhesive.

The adhesive in this example is applied only to one spot at a bottom of a peripheral edge of the coupling lens. Accordingly, shrinkage of the adhesive in the curing process would disadvantageously cause the optical axes of the light-emitting element and the coupling lens to become misaligned with each other (particularly vertically in this example), which would render proper optical axis alignment difficult to achieve.

With this in view, one or more aspects of the present invention have been made in an attempt to provide an improved light source device in which misalignment involved in fixing a coupling lens to a holding member with an adhesive can be significantly reduced, and an optical scanner including such an improved light source device.

SUMMARY

It is one aspect of the present invention to provide a light source device comprising a light-emitting element, a coupling lens configured to condense a beam of light emitted from the light-emitting element, and a holding member configured to hold the light-emitting element and the coupling lens. The holding member has an adherend that is opposite to a surface of the coupling lens facing to the light-emitting element in a direction of an optical axis of the coupling lens, and part of the surface of the coupling lens facing to the light-emitting element is bonded to the adherend of the holding member.

In another aspect of the present invention, an optical scanner is provided which comprises a light source device as described above, a deflector configured to deflect a beam of light emitted from the light source device to scan a target surface with the beam of light, and an image forming optical system configured to cause the beam of light deflected by the deflector to focus on the target surface to form an image thereon.

BRIEF DESCRIPTION OF THE DRAWINGS

The above and other aspects, other advantages and further features of the present invention will become more apparent by describing in detail illustrative, non-limiting embodiments thereof with reference to the accompanying drawings, in which.

DETAILED DESCRIPTION

A detailed description will be given of illustrative embodiments of the present invention with reference to the drawings. In the following description, a general setup of a laser printer 1 as one example of an image forming apparatus will be described at the outset, and then features of an optical scanner 100 and a light source device 120 will be described in detail, respectively.

<General Setup of Laser Printer>

Figure 1:
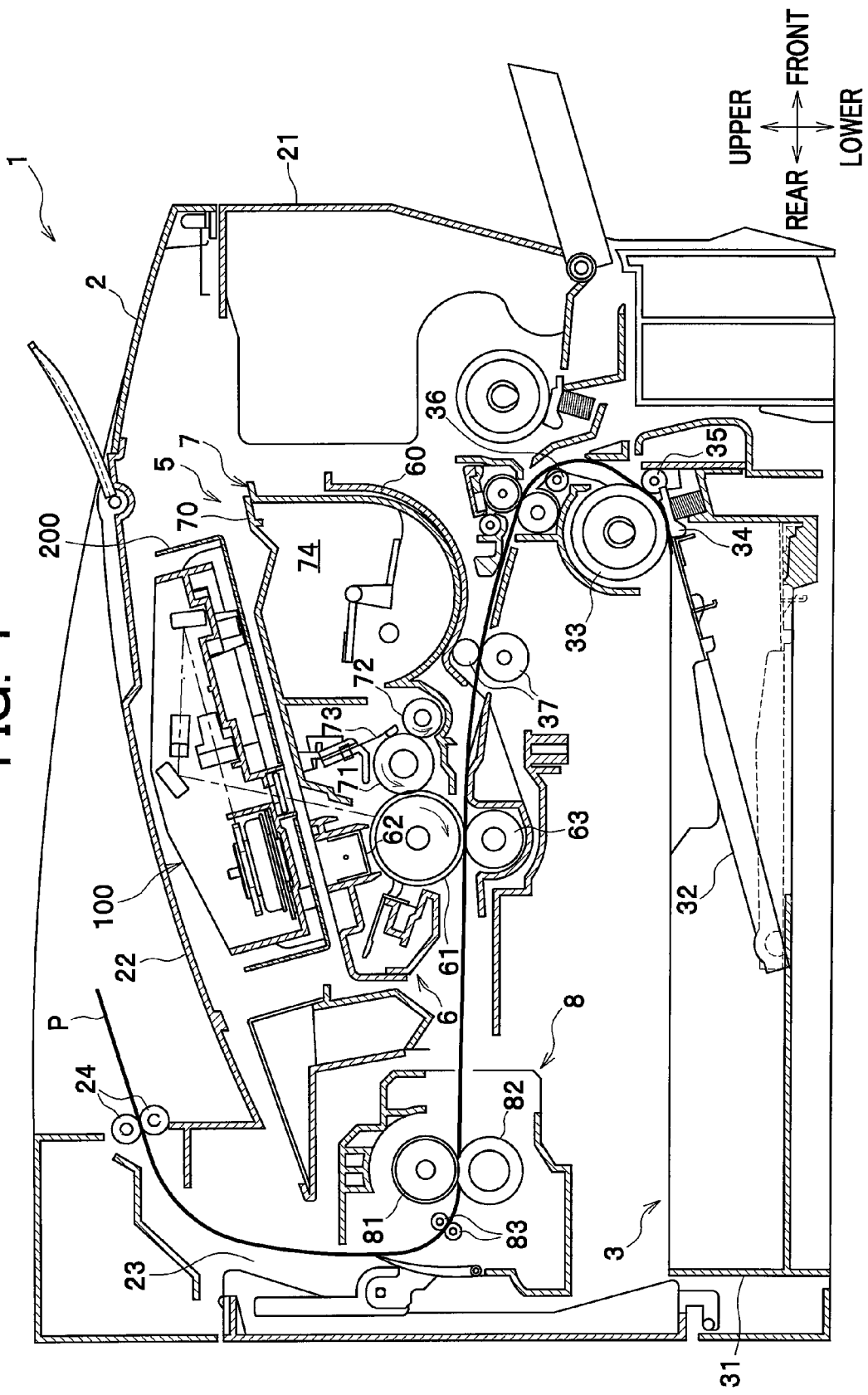
FIG. 1 is a vertical section of a laser printer as an example of an image forming apparatus.

As shown in FIG. 1, a laser printer 1 comprises a body casing 2, and several components housed within the body casing 2 which principally include a sheet feeder unit 3 for feeding a sheet P (e.g., of paper), an optical scanner 100, a process cartridge 5 for transferring a toner image onto the sheet P, and a fixing unit for thermally fixing the toner image transferred on the sheet P.

Hereinbelow, in describing the arrangement and operation of each component in the laser printer 1, the direction is designated as from the viewpoint of a user who is using (operating) the laser printer 1. To be more specific, in FIG. 1, the right-hand side of the drawing sheet corresponds to the "front" side of the printer, the left-hand side of the drawing sheet corresponds to the "rear" side of the printer, the back side of the drawing sheet corresponds to the "right" side of the printer, and the front side of the drawing sheet corresponds to the "left" side of the printer. Similarly, the direction of a line extending from top to bottom of the drawing sheet corresponds to the "vertical" or "up/down (upper/lower or top/bottom)" direction of the printer.

The sheet feeder unit 3, provided in a lower space within the body casing 2, principally includes a sheet feed tray 31 for storing sheets P, a sheet pressure plate 32 for pushing up front sides of the sheets P, a sheet feed roller 33, a sheet feed pad 34, paper powder remover rollers 35, 36, and registration rollers 37. Sheets P in the sheet feed tray 31 are pressed against the sheet feed roller 33 by the sheet pressure plate 32, and each sheet P, separated from the others by the sheet feed roller 33 and the sheet feed pad 34, is conveyed through the paper powder remover rollers 35, 36 and the registration roller 37 into the process cartridge 5.

The optical scanner 100 is provided in an upper space within the body casing 2, and configured to emit a laser beam (a beam of laser: see alternate long and short dashed lines) produced based upon image data, to expose a surface of a photoconductor drum 61 as one example of a photoconductor to light, thereby forming an electrostatic latent image thereon. The detailed description of the configuration of the optical scanner 100 will be given later.

The process cartridge 5 is disposed below the optical scanner 100 within the body casing 2, and configured to be installable in and removable from the body casing 2 through an opening formed when a front cover 21 provided at the body casing 2 is swung open. The process cartridge 5 includes a drum unit 6 and a development unit 7.

The drum unit 6 comprises a drum case 60 and components housed within the drum case 60 which principally include a photoconductor drum 61, a charger 62 and a transfer roller 63. The development unit 7 is configured to be detachably attached to the drum unit 6. The development unit 7 comprises a development case 70 and components housed within the development case 70 which include a development roller 71, a supply roller 72, a doctor blade 73, and a toner reservoir 74 which is configured to store toner therein.

In the process cartridge 5, a surface of the photoconductor drum 61 is uniformly charged by the charger 62, and then exposed to a rapidly sweeping laser beam so that an electrostatic latent image based upon image data is formed on the photoconductor drum 61. Meanwhile, toner in the toner reservoir 74 is supplied via the supply roller 72 to the development roller 71, and goes through between the development roller 71 and the doctor blade 73 so that a thin layer of toner having a predetermined thickness is carried on the development roller 71.

The toner carried on the development roller 71 is supplied to the electrostatic latent image formed on the photoconductor drum 61. Accordingly, the electrostatic latent image is visualized and a toner image is formed on the photoconductor drum 61. Thereafter, while a sheet P is conveyed through between the photoconductor drum 61 and the transfer roller 63, the toner image on the photoconductor drum 61 is transferred onto the sheet P.

The fixing device 8 is provided rearwardly of the process cartridge 5, and principally includes a heating roller 81, a pressure roller 82 and conveyor rollers 83. A sheet P on which a toner image is transferred is held and forwarded through between the heating roller 81 and the pressure roller 82 so that toner on the sheet P is thermally fixed on the sheet P. The sheet P with the toner image thermally fixed thereon is conveyed by the conveyor rollers 83 to an output path 23. The sheet P thus passes through the output path 23, and is then ejected therefrom onto a sheet output tray 22 by an output roller 24.

<Configuration of Optical Scanner in Detail>

Figure 2:
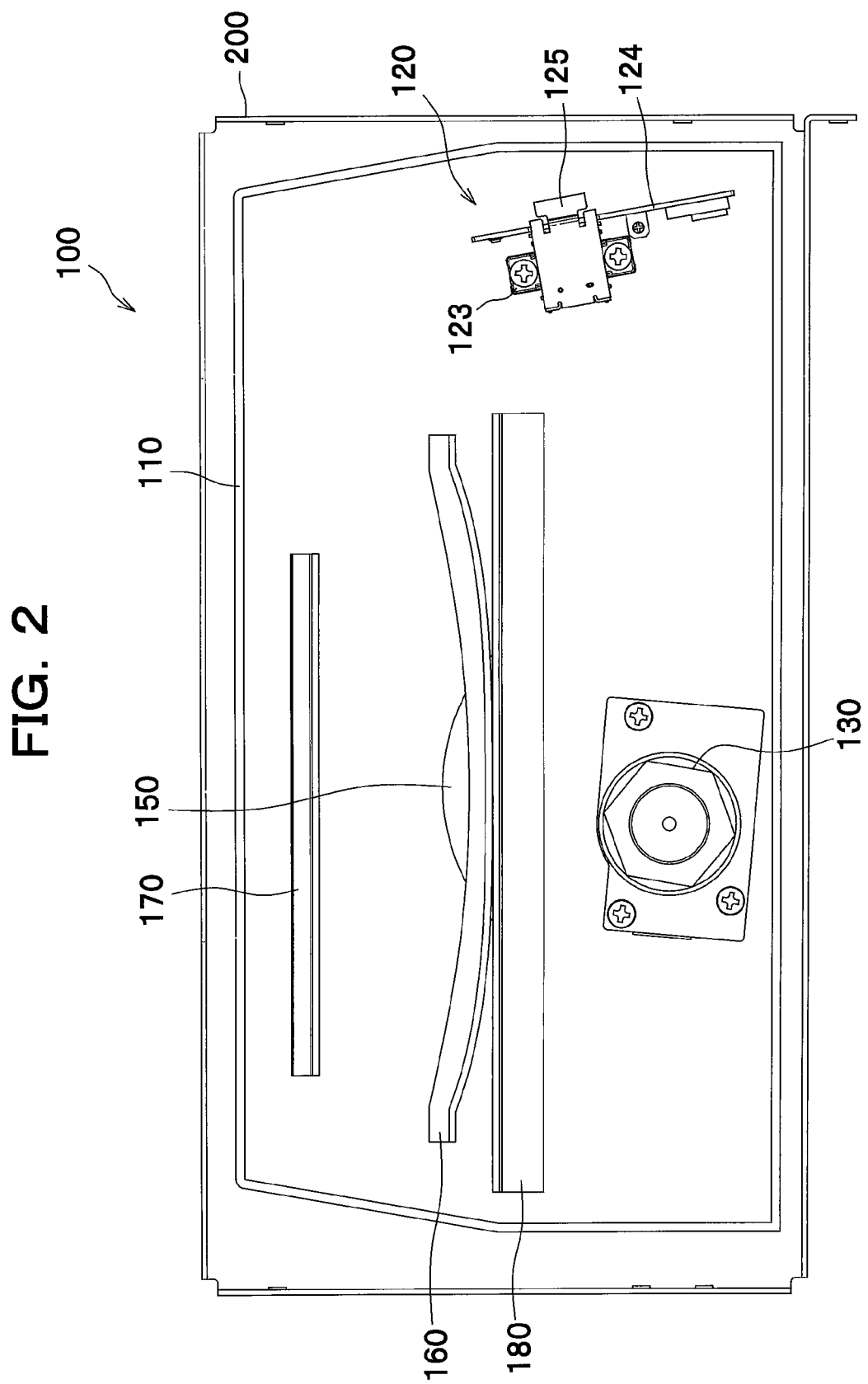
FIG. 2 is a plan view of an optical scanner.
Figure 3:
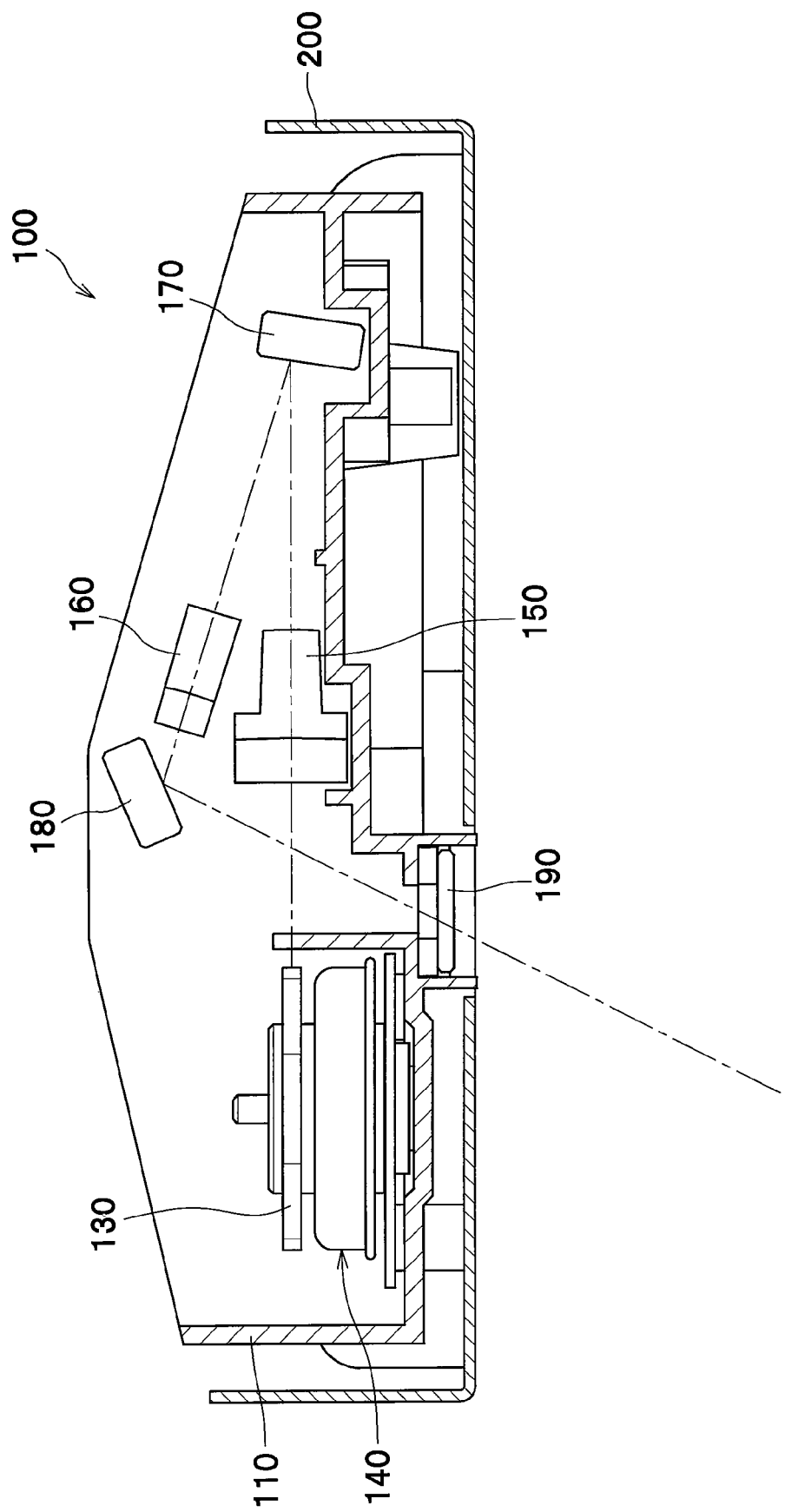
FIG. 3 is a sectional view of the optical scanner.

A detailed description will now be given of the configuration of the optical scanner 100. As shown in FIGS. 2 and 3, the optical scanner 100 comprises a plastic scanner frame 110 and some components housed within the scanner frame 110 which principally include a light source device 120, a polygon mirror 130 as one example of a deflector configured to deflect a laser beam (beam of light) emitted from the light source device 120, and an image forming optical system configured to cause the laser beam deflected by the polygon mirror 130 to focus on the surface (target surface to be scanned) of the photoconductor drum 61 to form an image thereon. In this embodiment, the image forming optical system includes an fθ lens 150, a cylindrical lens 160 and mirrors 170, 180.

The light source device 120 is a device which emits a laser beam (beam of light), to which the surface of the photoconductor drum 61 is exposed selectively in a pattern according to image data. The configuration of the light source device 120 will be described later in more detail.

The polygon mirror 130, disposed in a position downstream of the light source device 120, has a hexagonal prismatic form of which six sides are each formed with a reflecting mirror. The polygon mirror 130 is configured to rapidly spin so that a laser beam reflected therefrom is deflected in the main scanning direction to scan at a constant angular velocity.

As shown in FIG. 3, the fθ lens 150 is a scanning lens disposed in a position, downstream of the polygon mirror 130, such that the laser beam deflected for scanning the target surface by the polygon mirror 130 passes therethrough. The fθ lens 150 is configured to convert the laser beam which scans at a constant angular velocity to that which scans at a constant linear velocity.

The mirror 170 is an element disposed in a position downstream of the fθ lens 150 to reflect the laser beam having passed through the fθ lens 150 so that the light path of the laser beam is folded and directed toward the cylindrical lens 160.

The cylindrical lens 160 is a scanning lens disposed in a position, downstream of the mirror 170 and above the fθ lens 150, such that the laser beam reflected from the mirror 170 passes therethrough. The cylindrical lens 160 is configured to refract and converge a laser beam into the sub-scanning direction.

The mirror 180 is an element disposed in a position, downstream of the cylindrical lens 160, such that the laser beam having passed through the cylindrical lens 160 is reflected therefrom and directed to the photoconductor drum 61 (see FIG. 1). To be more specific, the laser beam reflected from the mirror 180 passes through a glass plate 190 mounted to the scanner frame 110, to rapidly scan the surface of the photoconductor drum 61.

The scanner frame 110 is a frame made of a plastic resin in a substantially rectangular parallelepiped box-like form, to which the light source device 120 (see FIG. 2), the fθ lens 150, the cylindrical lens 160, the mirrors 170, 180, and other components are mounted.

A metal plate 200 is a frame formed by bending a metal sheet. The plastic scanner frame 110 is mounted to the metal frame 200 for reinforcement. By mounting the metal frame 200 in the body casing 2, the optical scanner 100 is located and fixed in the upper space within the body casing 2 (see FIG. 1).

As shown in FIG. 1, the body casing 2 is configured to support the metal frame 200 on which the optical scanner 100 is mounted, and the photoconductor drum 61. The photoconductor drum 61 is located in place below the optical scanner 100 within the body casing 2, and supported therein through a case (drum case 60) of the process cartridge 5 in which the photoconductor drum 61 is installed.

<Configuration of Light Source Device in Detail>

Figure 4:
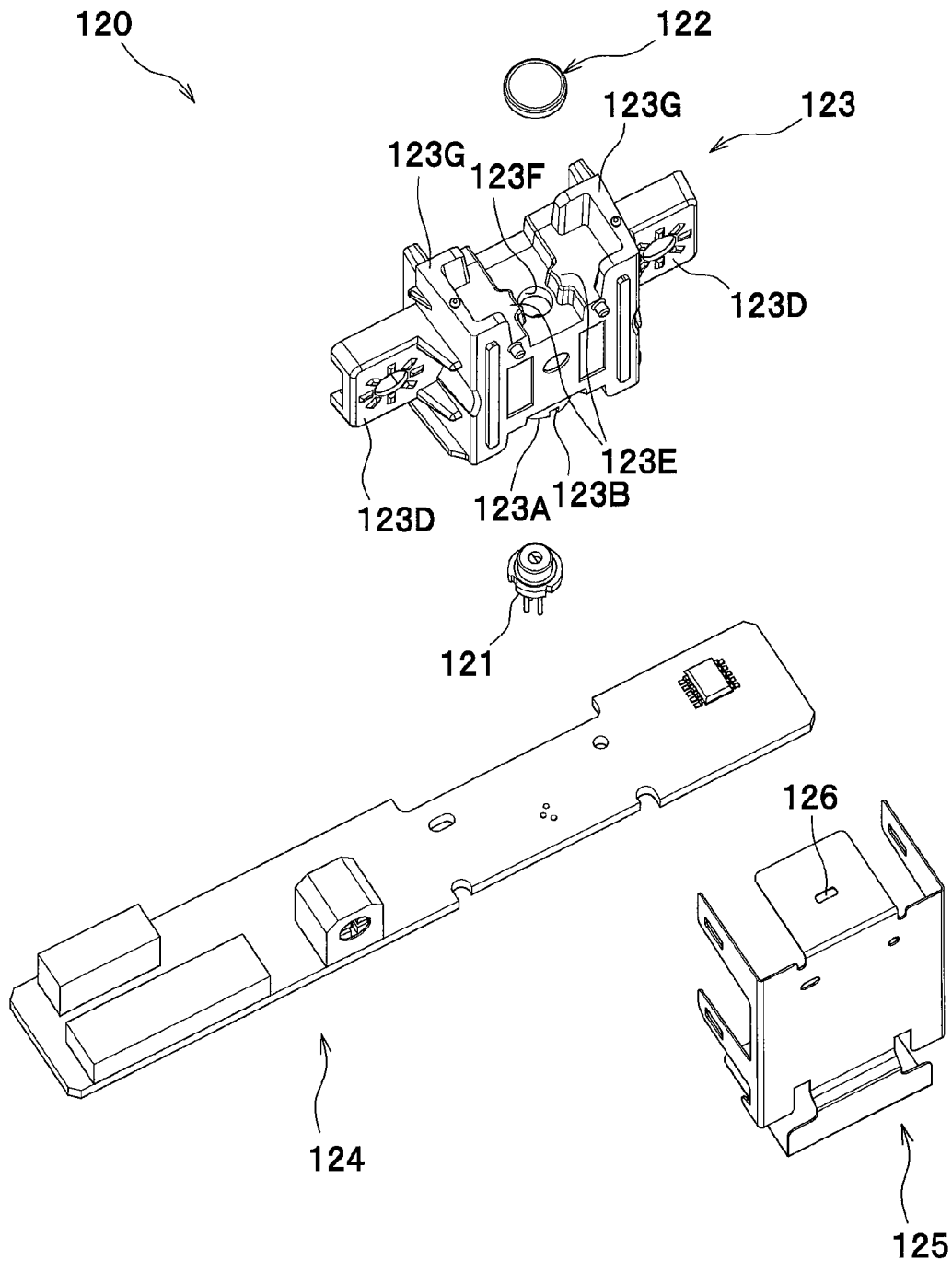
FIG. 4 is an exploded perspective view of a light source device.
Figure 5A:
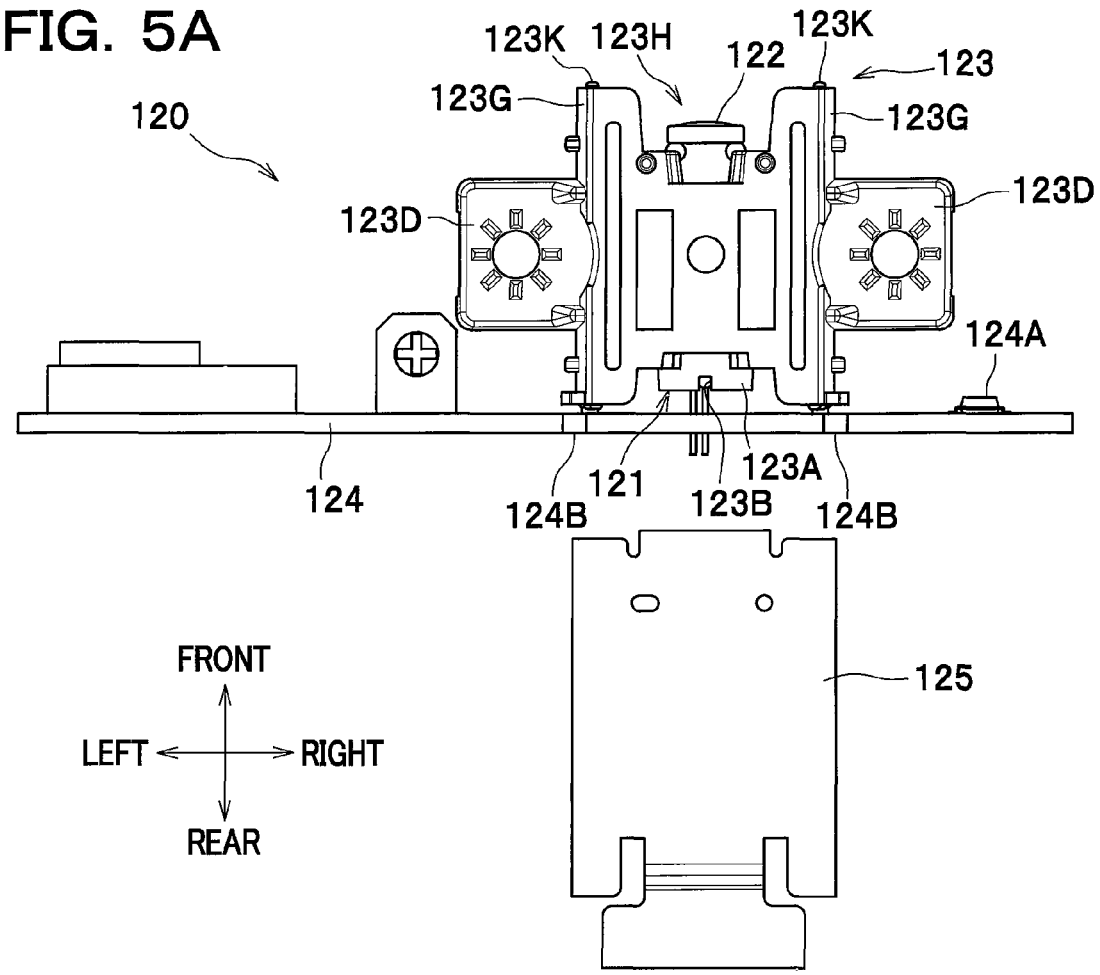
FIG. 5A is a plan view of an interior of the light source device as shown with a shielding member dismounted therefrom.
Figure 5B:
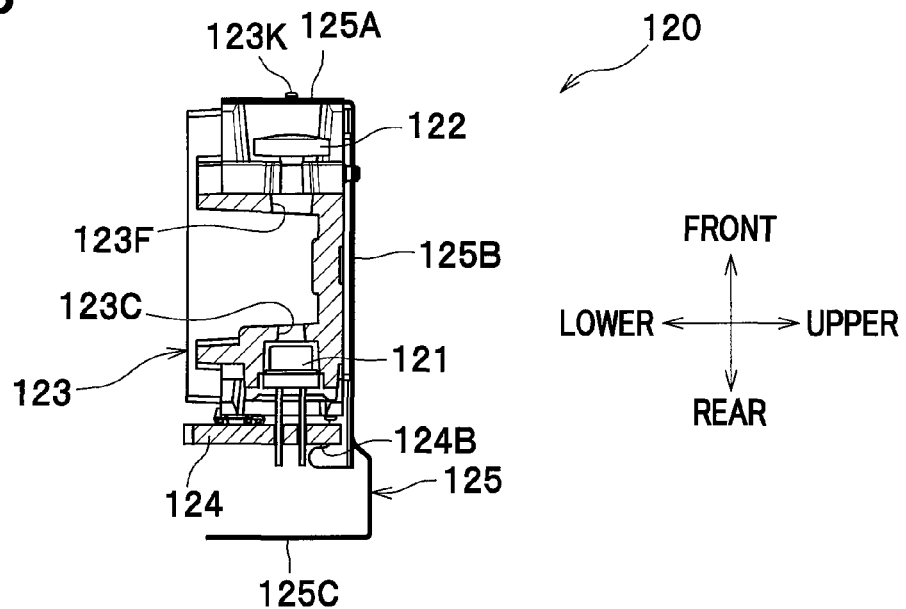
FIG. 5B is a longitudinal section of the light source device shown in FIG. 2.

Next, a configuration of the light source device 120 will be described in detail. As shown in FIGS. 4, 5A and 5B, the light source device 120 principally includes a semiconductor laser 121 as one example of a light-emitting element, a coupling lens 122, a holder 123, as one example of a holding member, configured to hold the semiconductor laser 121 and the coupling lens 122, a circuit board 124, and a shielding member 125.

Figure 7:
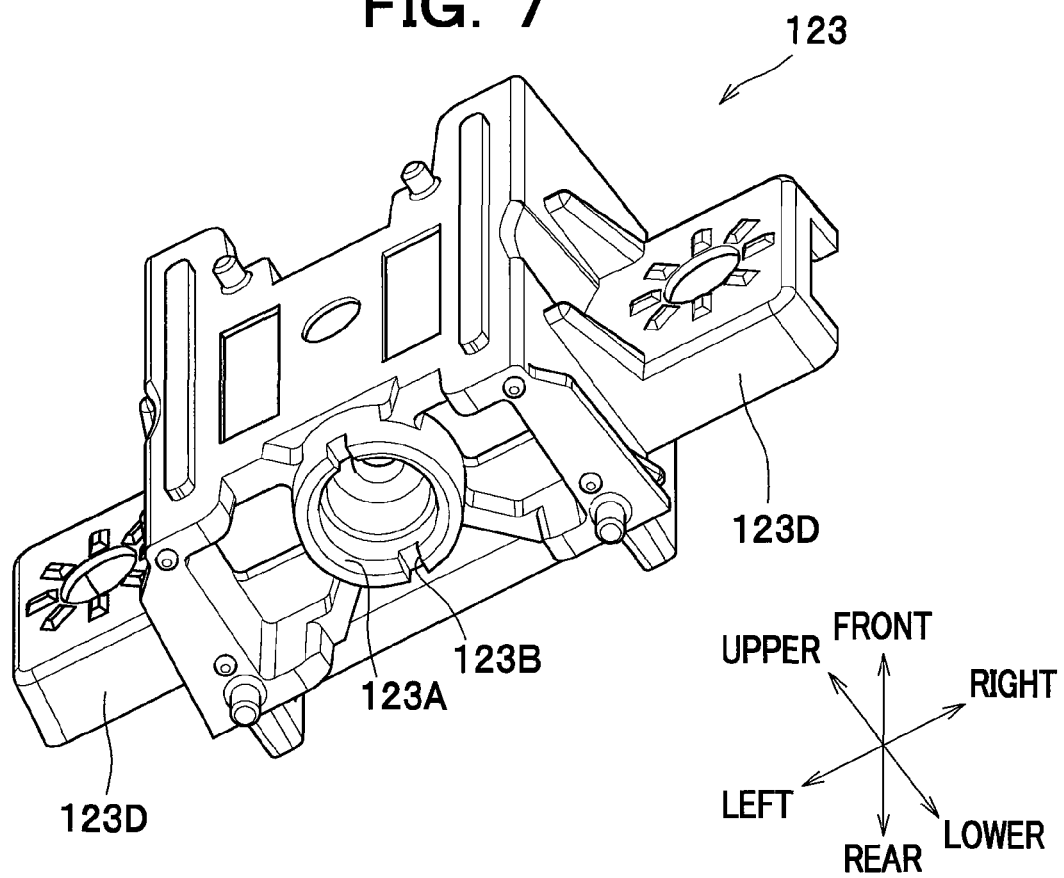
FIG. 7 is a perspective view of the holder as viewed from an LD mount portion side.

In the following description, the directions downstream and upstream with respect to the direction of travel of the laser beam emitted from the light source device 120 will be referred to as "front" and "rear", respectively, and the upper, lower, left and right directions are mentioned to designate the directions as shown in FIG. 7.

The semiconductor laser 121 is a laser light source (laser diode or LD) known in the art, in which stimulated emission of coherent light occurs at a pn junction of a semiconductor by carrier injection. The semiconductor laser 121 is electrically connected with a driver part 124A mounted on/in the circuit board 124. Upon receipt of an emission control signal produced in accordance with image data to be formed, the driver part 124A drives the semiconductor laser 121 in accordance with the control signal.

Figure 8A:
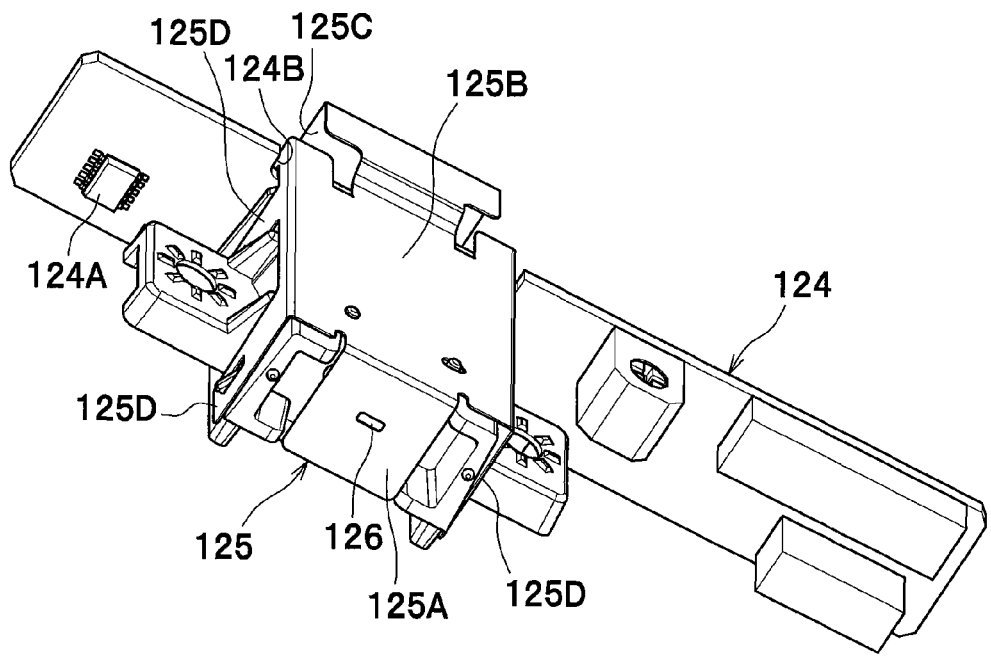
FIG. 8A is a perspective view of the light source device as viewed from an aperture side.

The coupling lens 122 is a lens (collimating lens) known in the art in which a diverging laser beam (beam of light) is converged into a parallel or substantially parallel beam for coupling to a subsequent (downstream) optics. The laser beam having passed through the coupling lens 122 becomes a narrower beam of which the cross-sectional area is restricted when the laser beam passes through the aperture 126 (see FIG. 8A) formed in a shielding member 125 which will be described later, and travels toward the polygon mirror 130 (see FIG. 2).

As shown in FIGS. 4-7, the holder 123 is a member configured to hold the semiconductor laser 121 at its rear-end portion and the coupling lens 122 at its front-end portion, respectively, in such a state that the positions of the semiconductor laser 121 and the coupling lens 122 are in proper alignment with each other. The holder 123 is a member molded integrally from a plastic resin (insulating material) in one piece and having a monolithic structure. To be more specific, the main body of the holder 123 has a substantially rectangular parallelepiped box-like form with a bottom side open. A lens mount portion to which a coupling lens is to be mounted is formed at a front side of the main body, and an LD mount portion to which a semiconductor laser is to be mounted is formed at a rear side of the main body.

The LD mount portion and the lens mount portion of the holder 123 have openings 123C and 123F, respectively. These openings 123C and 123F are located to permit a laser beam emitted from the semiconductor laser 121 to pass through the opening 123C, an inner space of the holder 123, and the opening 123F, and to thus strike the coupling lens 122. At left and right sidewall portions of the holder 123, fastening tabs 123D are formed which protrude to the left and to the right and each of which has a threaded hole through which a screw is applied to fasten the holder 123 to the scanner frame 110.

In the rear-end portion (LD mount portion), as shown in FIG. 7, a socket portion 123A is formed which is configured to allow a light-emitting surface end of the semiconductor laser 121 to be fitted therein from rearward of the holder 123. Notches 123B for holding adhesives are provided at two spots on the edge of the opening of the socket portion 123A. The opening 123C of the LD mount portion is formed at the center of the bottom (front end) of the socket portion 123A.

In the front-end portion (lens mount portion), as shown in FIGS. 4, 5A and 5B, two adherends 123E and two protecting portions 123G are formed. The adherends 123E are surfaces to which the coupling lens 122 is fixed (specifically, two spots near a peripheral edge of the surface of the coupling lens 122 facing to the semiconductor laser 121 are bonded). The protecting portions 123G are located around and separate from the adherends 123E (i.e., separate from the coupling lens 122 as bonded thereto) and configured to surround the coupling lens 122. In FIGS. 5A, 5B and 6, and FIGS. 9 and 10 which will be referred to later, adhesives with which the coupling lens 122 is bonded to the adherends 123E are illustrated in an exaggerated manner, not in its actual dimensional proportion.

The adherends 123E are the surfaces opposite to the surface of the coupling lens 122 facing to the semiconductor laser 121 in a direction of an optical axis of the coupling lens 122. To be more specific, two frontwardly bulged portions are formed at left and right spots (axisymmetric with respect to the optical axis) adjacent to the edge of the opening 123F in the holder 123, and flat faces formed at the front ends of the bulged portions constitute the adherends 123E. Spacing between the two adherends 123E is set such that the portions of the surface of the coupling lens 122 bonded to the adherends 123E are located outside of a region through which a laser beam emitted from the semiconductor laser 121 is allowed to pass.

The two protecting portions 123G are configured to partially cover the peripheral end face of the coupling lens 123 as mounted. Each of the protecting portions 123G is located separate from the coupling lens 122 in a direction perpendicular to the optical axis of the coupling lens 122 and protrudes frontward (i.e., downstream in a direction of travel of the laser beam) beyond a position of a surface of the coupling lens 122 from which the laser beam goes out.

Figure 6:
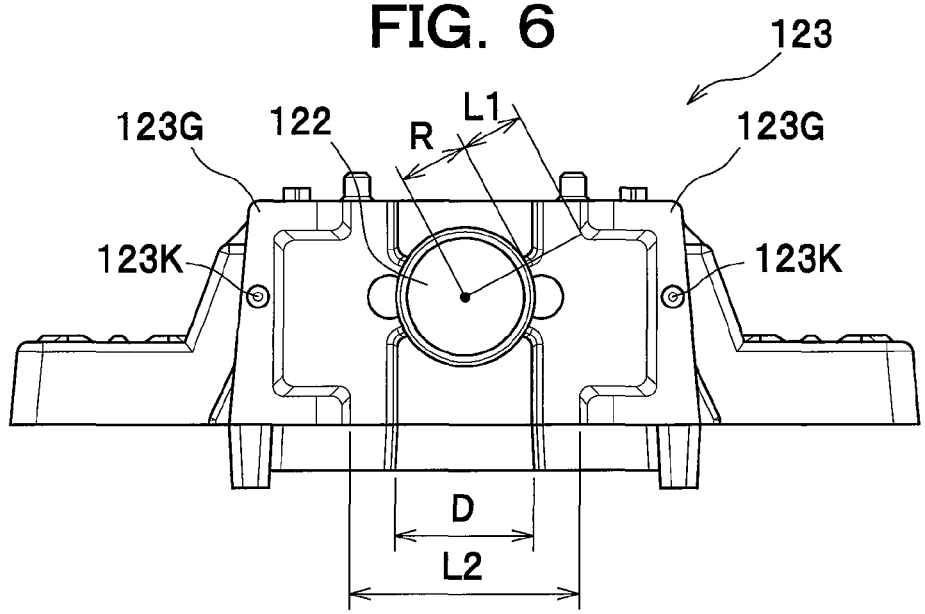
FIG. 6 is a front view of a holder (holding member) for explaining a configuration of a protecting portion thereof.

As shown in FIG. 6, the distance L1 between the peripheral end face of the coupling lens 122 and the protecting portions 123G is greater than a radius R of the coupling lens 122 (L1>R). Each of the two protecting portion 123G is formed to have a substantially U-shaped cross section as viewed in the direction of the optical axis of the coupling lens 133. The front end of each protruding protecting portion 123G is in a plane perpendicular to the optical axis of the coupling lens 122 and is configured to provide a support foot portion on which the holder 123 can be stably supported when the holder 123 is placed on a level surface with the front end facing downward.

In the present embodiment, a small projection 123K is provided on a flat surface that constitutes the front end of each protecting portion 123G. These two small projections 123K are utilized to locate the holder 123 in place on a dedicated workbench that has a corresponding positioning hole provided therein, in the step of soldering lead pins of the semiconductor laser 121 to the circuit board 124, as will be described later. It is thus to be understood that the small projection 123K on the front end of each protecting portion 123G is provided optionally only when soldering is performed using such a dedicated workbench. The small projection 123K is not the part of the end of the protecting portion 123G which serves as "support foot portion" of the holder 123.

An opening 123H (see FIG. 5A) formed between the two protecting portions 123G exposes the peripheral end of the coupling lens 122 so that the coupling lens 122 is accessible therethrough. The opening 123H is provided so that a chuck 300, as will be described later (see FIG. 9), holding the peripheral end of the coupling lens 122 can locate the coupling lens 122 in a predetermined position near the adherends 123E of the holder 123, when the coupling lens 122 is fixed to the adherends 123E.

To that end, the distance L2 between the protecting portions 123G separated by the opening 123H is set greater to some extent than a diameter D of the coupling lens 122 (L2>D), so that the chuck 300 inserted when locating the coupling lens 122 in a direction perpendicular to the optical axis of the coupling lens 122 never interferes with the protecting portions 123G. In particular, the opening 123H in this embodiment extends rearward (to the semiconductor laser 121 side) beyond a position of the surface of the coupling lens 122 facing to the semiconductor laser 121, and thus locating the coupling lens 122 in the optical axis direction by the chuck 300 can be performed easily and smoothly without interference with the protecting portions 123G.

On the surface of the circuit board 124, as shown in FIGS. 4, 5A, 5B 8A, 8B and 10, a driver part (driver chip) 124A configured to drive the semiconductor laser 121 and other circuitry and elements are mounted. The semiconductor laser 121 is electrically connected with the driver part 124A by means of soldering (see reference character 124C of FIG. 10). Portions at the back side of the circuit board 124 around two notches with which the shielding member 125 is engageable constitute grounding parts 124B.

The shielding member 125 is made by press working of a metal sheet, and includes a first wall portion 125A which extends to cover the front end portion of the holder 123 and in which an aperture 126 is provided, a second wall portion 125B which extends from the upper end of the first wall portion 125A to cover the coupling lens 122 and the semiconductor laser 121, and a third wall portion 125C which extends from the rear end of the second wall portion 125B to cover part (located substantially in the center and including a portion at which the semiconductor laser is mounted) of the back side of the circuit board 124 (the side reverse to the side on which circuitry and elements are mounted).

The shielding member 125 also includes four side strips 125D which extend from two spots, front and rear, at left and right side edges of the second wall portion 125B, downward along the sidewalls of the holder 123. Each of the side strips 125D has an opening in a position aligned with a corresponding projection that is one of four engageable projections formed at the side walls of the holder 123. By making use of this configuration, the shielding member 125 is snapped on the holder 123 and fixed thereon.

The shielding member 125 is engaged at two spots thereof rearward of the rear side strips 125 with the notches of the circuit board 124, and these two spots are soldered to the grounding parts 124B provided at the back side of the circuit board 124, so that the shielding member 125 are fixed to the circuit board 124.

<Manufacturing Process of Light Source Device>

Next, a manufacturing process of the light source device 120 according to the present embodiment will be described.

(Step 1) Resin material heated and molten is injected into a dedicated injection mold to integrally mold a holder 123.

(Step 2) Sheet metal is subjected to a press in which the sheet metal is cut, blanked, bent and otherwise worked to form a shielding member 125.

(Step 3) A semiconductor laser 121 is fitted into a socket portion 123A formed in a rear-end portion (LD mount portion) of the holder 123, and fixed by bonding with an adhesive filled in notches 123B at the socket portion 123A.

Figure 9:
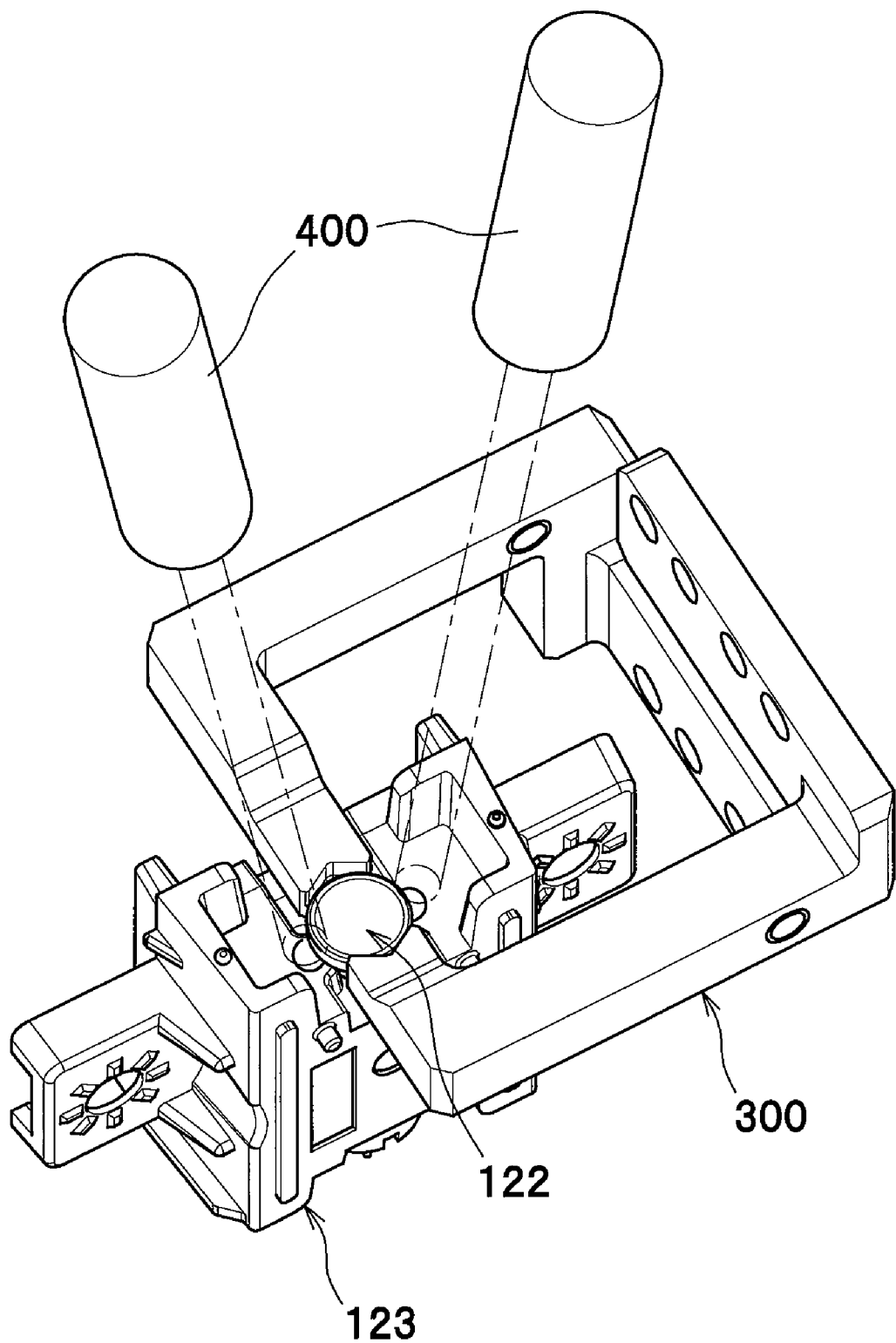
FIG. 9 is a perspective view for illustrating the steps of positioning and fixing a coupling lens to the holder.

(Step 4) An adhesive made of ultraviolet curing resin is applied to adherends 123E formed in a front-end portion (lens mount portion) of the holder 123, and a coupling lens 122 held by a chuck 300 is located in place. After the coupling lens 122 is located appropriately, a ray of ultraviolet radiation (UV) is applied to the adhesive by an ultraviolet radiator 400 to cure the adhesive, as shown in FIG. 9. After completion of curing, the chuck 300 is retreated from the coupling lens 122.

Figure 10:
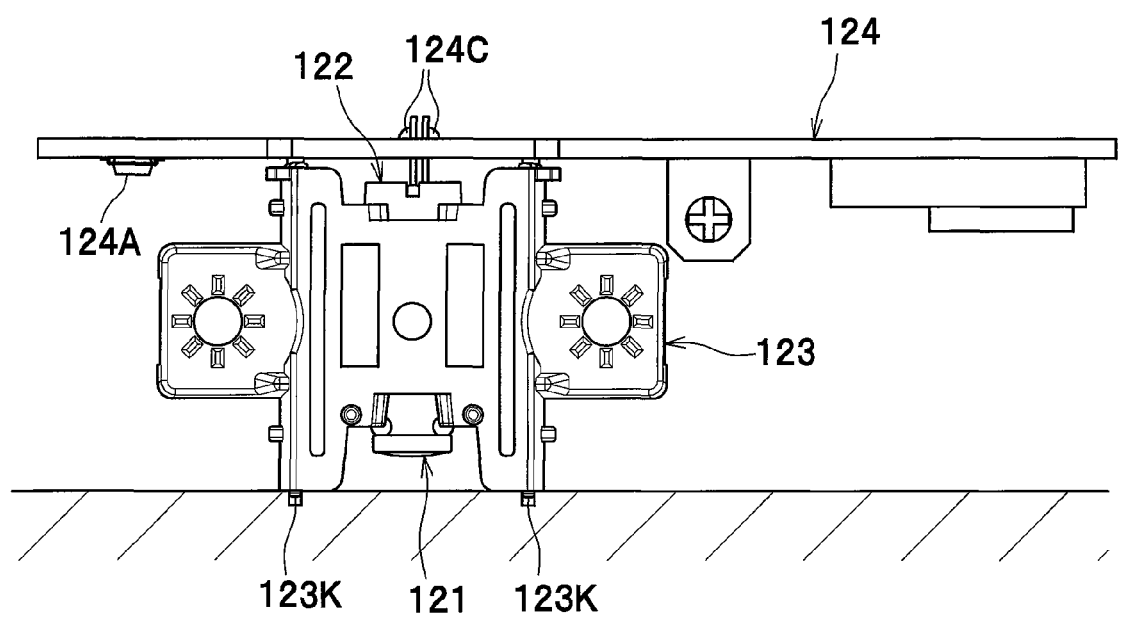
FIG. 10 is a perspective view for illustrating the step of electrically connecting a semiconductor laser (light-emitting element) held by the holder and a circuit board.

(Step 5) As shown in FIG. 10, the holder 123 is placed with its rear-end portion facing upward on the workbench, and a circuit board 124 is soldered to lead pins of the semiconductor laser 121 (see reference character 124C). In the illustrated embodiment, small projections 123K formed on the front-end portion of the holder 123 are fitted in the positioning holes formed on the workbench, so that the holder 123 is not displaced but stably placed on the workbench.

(Step 6) The shielding member 125 is snapped and fixed on the holder 123 with the semiconductor laser 121 soldered to the circuit board 124, utilizing the side strips 125D of holder 123.

Figure 8B:
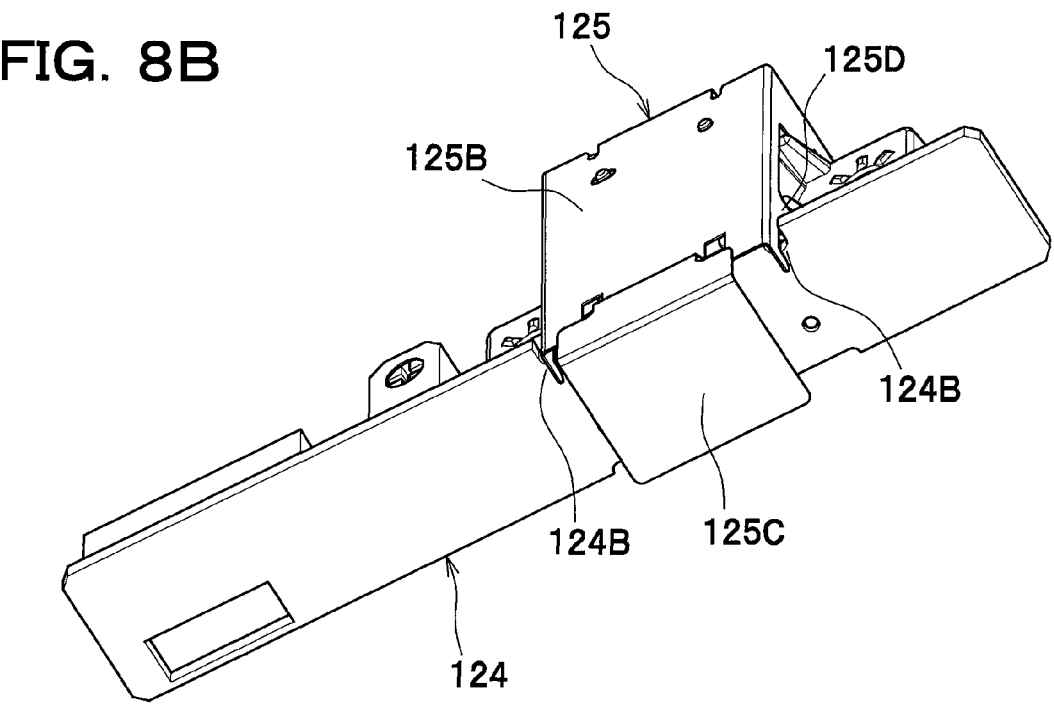
FIG. 8B is a perspective view of the light source device as viewed from a circuit board back side.

(Step 7) The shielding member 125 is soldered to the circuit board 124 at two grounding parts 124B shown in FIG. 8B. Thus, the shielding member 125 is electrically connected with the grounding parts 124B of the circuit board 124 and physically fixed thereto at the same time. As a result, the circuit board 124 is indirectly fixed to the holder 123 through the shielding member 125 snapped on the holder 123.

<Operations and Advantageous Effects>

The characteristics and operations of the present embodiment, and the advantages (effects) achieved thereby will be described hereinbelow.

1. Structure for Mounting Coupling Lens to Holder

According to the present embodiment, the holder 123 has adherends 123E that are opposite to a surface of the coupling lens 122 facing to the semiconductor laser 121 in a direction of the optical axis of the coupling lens 122, and part of the surface of the coupling lens 122 facing to the semiconductor laser 121 is bonded to the adherends 123E of the holder 123.

With this configuration, the surface of the coupling lens 122 facing to the semiconductor laser 121 is bonded to the adherends 123E that are opposite thereto in the direction of the optical axis thereof, and thus any displacement of the coupling lens 122 caused by shrinkage of the adhesive during its curing process will occur mainly in the direction of the optical axis of the coupling lens 122, with the result that the undesirable shift of the optical axes of the semiconductor laser 121 and the coupling lens 122 relative to each other is reduced significantly. Accordingly, in contrast to the conventional mounting structure in which the peripheral end face of the lens is bonded to the holder, the coupling lens 122 can be positioned with increased accuracy.

In the present embodiment, bonding of the coupling lens 122 to the holder 123 is achieved by using an ultraviolet curing resin. The ultraviolet curing resin needs only a short period of time to cure, and the time required for holding the lens with its alignment adjusted appropriately can be shortened. Moreover, the ultraviolet curing resin is neither subject to the whitening such as appears in instant adhesives, nor curable without application of ultraviolet rays (thus, application prior to alignment is possible). Therefore, the ultraviolet curing resin has the advantage of a high degree of flexibility in designing the process steps.

According to the present embodiment, the adherends 123E to which an adhesive is applied are located at two spots which are symmetric as viewed in the direction of the optical axis of the coupling lens 122, and thus the undesirable shift of the optical axis of the coupling lens 122 relative to that of the semiconductor laser 121 can be reduced more in comparison with the conventional mounting structure in which only one spot of the peripheral end face of the lens is bonded to the holder.

The spots at which the adhesive is applied may preferably be set such that the resultant of forces acting together on the coupling lens 122 upon shrinkage of the light curing resin in the curing process is balanced in a plane perpendicular to the optical axis of the coupling lens 122. Accordingly, in view of the high-precision positioning, it may be advantageous that the light curing resin is applied to a plurality of spots which are rotationally symmetric as viewed in the direction of the optical axis of the coupling lens 122, and it is appreciated that the present embodiment illustrates one of its simplest configurations by way of example.

In the present embodiment, as the part of the coupling lens 122 bonded to the holder 123 (adherends 123E), the part of the surface of the coupling lens 122 facing to the light-emitting element (semiconductor laser 121), located outside a region through which the beam of light is allowed to pass is utilized. Therefore, one and more aspects of the present invention can be achieved without loss of the functionality of the coupling lens 122.

2. Structure for Protecting Lens Mount Portion of Holder

To make the conventional light source device, a coupling lens is aligned with and fixed to a holder which holds a light-emitting element, but before that, a circuit board for driving the light-emitting element is mounted to the holder and the circuit board is soldered to the light-emitting element. With this process, however, inspections for characteristics of the light-emitting element itself and adjustments for alignment cannot be carried out at the same time. According to the present embodiment, the circuit board 124 can be attached to the holder 123 after the coupling lens 122 is aligned with the light-emitting element (semiconductor laser 121) and fixed to the holder 123. Therefore, the characteristics of the light-emitting element itself can be checked at the same time as the adjustments for alignment is carried out.

In cases where the coupling lens 122 is fixed directly to the holder 123 without a lens barrel or any similar part interposed therebetween as in the present embodiment, the coupling lens 122 which has already been aligned with the semiconductor lens 121 would be exposed at the front end of the holder 123 in an unprotected state, and thus the operation of soldering the circuit board 124 to the semiconductor laser 121 fixed in the rear-end portion of the holder 123 could disadvantageously become difficult. In this embodiment, however, the holder 123 includes the protecting portions 123G which are separate from the coupling lens 122 in the direction perpendicular to the optical axis of the coupling lens 122 and protrude downstream beyond a position of the surface of the coupling lens 122 from which the beam of light goes out, in a direction of travel of the beam of light. Therefore, the coupling lens 122 is not left in an unprotected state.

Furthermore, according to the present embodiment, an end of each protecting portion 123G extending in the direction of the optical axis of the coupling lens 122 that is farther from the semiconductor laser 121 is in a plane perpendicular to the optical axis of the coupling lens 122, and thus the protecting portion 123G configured to provide a support foot portion on which the holder 123 is supported when the holder 123 is placed on a level surface with an end thereof closer to the light-emitting element (semiconductor laser 121) facing upward, as shown in FIG. 10. Accordingly, the workability of soldering the semiconductor laser 121 to the circuit board 124 is improved.

A plurality of the protecting portions 123G are provided around the peripheral end of the coupling lens 122, and arranged such that spacing between adjacent protecting portions 123G form an opening 123H that renders the peripheral end of the coupling lens 122 accessible. The opening 123H is designed such that a distance L2 established by the opening 123H provided between adjacent protecting portions 123G is greater than the diameter D of the coupling lens is 122, whereas the opening 123H extends beyond the coupling lens 122 to a light-emitting element (semiconductor laser 121) side. Accordingly, the protecting portions 123G do not interfere with the chuck 300 when the coupling lens 122 is located in place using the chuck 300 (see FIG. 9).

The protecting portions 123G are designed such that the distance L1 between each protecting portion 123G and the peripheral end of the coupling lens 122 is greater than the radius R of the coupling lens 122. Therefore, it should be unlikely that an adhesive is inadvertently put on the protecting portions 123G during the operation of applying the adhesive to the adherends 123E. Moreover, the protecting portions 123G do not interfere with radiation of ultraviolet rays when the coupling lens 122 located in place is bonded by causing an ultraviolet curing resin to cure using the ultraviolet radiator 400 (see FIG. 9).

The protecting portions 123G, the number of which is two in this embodiment, each have a substantially U-shaped cross section as viewed in the direction of the optical axis of the coupling lens 122. This shape of the protecting portions 123G is one of the desirable shapes as a support foot portion in that the holder 123 can be supported thereon more stably when the holder 123 is placed on a level surface when the semiconductor laser 121 is soldered to the circuit board 124.

3. Structure for Mounting Circuit Board to Holder

To fix a circuit board to a holder in the conventional light source device, customarily, a screw of M3 size or so is used which has a large screw head relative to the size of a light-emitting element, and places an obstruction to miniaturization of the holder. Moreover, a screw hole to be provided at or near the center of the circuit board would impair the electromagnetic interference shielding (EMI) property of the circuit board (particularly in cases where circuitry and elements are implemented on one side of the circuit board). In this conventional light source device, furthermore, the holder needs to have high strength enough to withstand a tightening torque of the screw in order to prevent distortion of the holder which could be caused by the tightening torque.

In the present embodiment, the circuit board 124 is fixed to the holder 123 through the shielding member 125 as described above, and thus no screw is required to fasten the circuit board 124 to the holder 123. Therefore, even when the circuit board 124 is attached to the holder 123 after the coupling lens 122 is aligned to and fixed to the holder 123 as in the present embodiment, an undesirable shift of the coupling lens 122 relative to the holder 123 due to distortion of the holder 123 that would be caused by the tightening torque of the screws can be prevented. Consequently, upsizing of the holder 123 by providing screw fastening portions (and any additional structure for preventing the deleterious effect of the tightening torque of the screw) can be prevented. Furthermore, loss of the EMI shielding property due to a screw hole, of the circuit board 124 can be prevented.

4. Structure of Shielding Member

According to the present embodiment, the shielding member 125 made of a metal plate has the first wall portion 125A, the second wall portion 125B and the third wall portion 125C with which at least part of the light-emitting element (semiconductor laser 121) and at least part of the circuit board 124 are covered. Moreover, this shielding member 125 is fixed on the grounding part 124B of the circuit board 124. Therefore, the light-emitting element (semiconductor laser 121) and electronic components, etc. on the circuit board 124 which are susceptible to static electricity are shielded and can be protected from static damage.

In particular, if a shielding member having an aperture is a separate member electrically floating without being grounded as is often the case with the conventional light source device, a surge of electricity generated at the shielding member could induce a detrimental effect on the light-emitting element and other elements on the circuit board. As a result, the elements on the circuit board would gradually be destroyed, which would disadvantageously shorten the lifespan of the light-emitting element and other elements.

According to the present embodiment, in contrast, the shielding member 125 having the aperture 125 (i.e., the first wall portion 125A) is electrically connected with grounding part 124B of the circuit board 124. Therefore, there is no likelihood of the light-emitting element (semiconductor laser 121) or other element being destroyed by a surge of electricity, with the result that the durability of the light source device 120 can be increased. Moreover, the shielding member 125 serves to shield the semiconductor laser 121 and the circuit board 124 and parts therearound at the ground potential, so that the electromagnetic environment compatibility (EMC) can be improved.

Although an illustrative embodiment of the present invention has been described above, the present invention is not limited to this specific embodiment. It is to be understood that modifications and changes may be made to any of the specific configurations without departing from the scope of the present invention as claimed in the appended claims.

In the above-described embodiment, the shielding member 125 is shown, by way of example, as being fixed on the grounding part 124B of the circuit board 124 by means of soldering. The fixing methods applicable in a manner consistent with the present invention are however not limited to this specific embodiment. For example, any other methods known in the art such as welding, brazing, and bonding with a conductive adhesive, which can fix and electrically connect the shielding member 125 to the grounding part 124B of the circuit board 124 at the same time, can be adopted as well.

In the above-described embodiment, the coupling lens 122 and the adherends 123E are shown, by way of example, as being bonded by means of an ultraviolet curing resin. The bonding methods applicable in a manner consistent with the present invention are however not limited to this specific embodiment. For example, the bonding can be achieved by means of an adhesive made of visible-radiation curing resin or any other adhesive known in the art.

In the above-described embodiment, the coupling lens 122 is shown, by way of example, as being bonded to the holding member (holder 123) at two spots which are symmetric with respect to the optical axis of the coupling lens 122, but the present invention is not limited to this specific embodiment. For example, any configuration, in which the coupling lens 122 is bonded to the holding member at three or more spots, may be applicable. In these alternatives, it is to be understood that all the bonding spots should preferably, but not necessarily, be rotationally symmetric as viewed in the direction of the optical axis of the coupling lens 122.

The specific configurations (shapes and sizes) of the protecting portions 123 as described in connection with the illustrative embodiment should be considered to be a preferred embodiment exemplified mainly in view of the convenience for its manufacturing process, and the present invention is not limited thereto. For example, only one protecting portion may be provided. The opening may not be provided. The design with no protecting portion provided may also be practicable. The opening 123H may be configured to expose the peripheral end face of the coupling lens 122 to such an extent that the chuck 300 can hold the coupling lens 122 located in place, that is, not necessarily be configured to wholly expose the same, as long as the coupling lens 122 is accessible therethrough. In other words, the opening 123H may not necessarily extend beyond the coupling lens 122 to a light-emitting element side, as in the present embodiment.

Even in cases where a plurality of protecting portions 123G are provided, not all of the protecting portions 123G may necessarily be one and the same shape. The shape of any of the protecting portions 123G in cross section as viewed in the direction of the optical axis of the coupling lens 122 may not be a substantially U-shaped cross section; alternatively, for example, a protecting portion may have an L-shaped cross section extending from a corner of a rectangular cross section of the holding member, or a substantially arc-shaped cross section, and any of differently shaped protecting portions may be adopted in combination where appropriate.

The holder 123 may preferably be a member of a monolithic structure having at least one adherend 123E and at least one protecting portion 123G integrally formed from a resin material as in the above-described embodiment, but the present invention is not limited to this specific configuration. For example, in cases where the configuration in which a protecting portion 123G is provided is adopted, it may be preferable that any external force which may possibly act on the protecting portion 123G is not transmitted to the coupling lens 122 and its adhered spots. The protecting portion 123G may be formed as a separate member which is fixed to the holder 123.

In the above-described embodiment, the polygon mirror 130 configured to have reflecting faces which spin to deflect a laser beam is adopted exemplarily as a deflector of the optical scanner 100, but the deflector consistent with the present invention is not limited thereto. For example, a vibrating mirror configured to have reflecting surfaces which vibrate to deflect a beam of light emitted from the light source device may be adopted, instead.

In the above-described embodiment, as an image forming optical system for causing the beam of light deflected by the deflector to focus on the target surface to form an image thereon, one specific configuration is exemplified in which a laser beam scanning at a constant angular velocity is converted by the fθ lens 150 to a beam scanning at a constant linear velocity, which is in turn directed by the mirror 170 to enter the cylindrical lens 160, and the laser beam converged by the cylindrical lens 160 in the sub-scanning direction is reflected by the mirror 180 to focus on the target surface to be scanned (of photoconductor drum 61), but the present invention is not limited to this specific configuration. For example, instead of the respective elements 150 and 160, a single lens component which serves as both the fθ lens 150 and the cylindrical lens 160 may be provided by which a laser beam scanning at a constant angular velocity is converted to a laser beam scanning at a constant linear velocity and thus-converted laser beam is converged in the sub-scanning direction.

In the above-described embodiment, the optical scanner 100 which includes the light source device 120 is applied to the laser printer 1 by way of example. The present invention is however not limited to this example. Alternatively, the light source device 120 and the optical scanner 100 consistent with the present invention may be used, for example, in any other image forming apparatus such as photocopiers, multifunction peripherals, etc., and other apparatuses such as measuring apparatuses, testing apparatuses, etc. other than the image forming apparatus.

What is claimed is:

1. A light source device comprising:
   a light-emitting element;
   a coupling lens configured to condense a beam of light emitted from the light-emitting element; and
   a holding member configured to hold the light-emitting element and the coupling lens, wherein the holding member has an adherend that is opposite to a surface of the coupling lens facing toward the light-emitting element in a direction of an optical axis of the coupling lens, and part of the surface of the coupling lens facing toward the light-emitting element is bonded to the adherend of the holding member,
   wherein the holding member includes a plurality of protecting portions each of which is separate from the coupling lens in a direction perpendicular to the optical axis of the coupling lens, and protrudes downstream beyond a position of a surface of the coupling lens from which the beam of light goes out, in a direction of travel of the beam of light, adjacent protecting portions being separate to form an opening that renders a peripheral end of the coupling lens accessible, and
   wherein two or more openings formed between the adjacent protecting portions are configured to extend beyond the coupling lens to a side on which the light-emitting element is disposed, and at least one pair of the two or more openings has openings disposed opposite to each other with the coupling lens positioned therebetween.

2. The light source device according to claim 1, wherein the part of the surface of the coupling lens bonded to the adherend of the holding member is located outside a region through which the beam of light is allowed to pass.

3. The light source device according to claim 1, wherein the coupling lens and the adherend of the holding member are bonded with a light curing resin.

4. The light source device according to claim 3, wherein the light curing resin is applied to a plurality of spots which are rotationally symmetric as viewed in the direction of the optical axis of the coupling lens.

5. The light source device according to claim 1, wherein a distance established by the opening between the adjacent protecting portions is greater than a diameter of the coupling lens.

6. The light source device according to claim 1, wherein at least one of the plurality of protecting portions has a substantially U-shaped cross section as viewed in the direction of the optical axis of the coupling lens.

7. The light source device according to claim 1, wherein at least one of the plurality of protecting portions has a substantially arc-shaped cross section as viewed in the direction of the optical axis of the coupling lens.

8. The light source device according to claim 1, wherein the opening extends beyond the coupling lens to a light-emitting element side.

9. The light source device according to claim 1, wherein a distance between each protecting portion and a peripheral end of the coupling lens is greater than a radius of the coupling lens.

10. The light source device according to claim 1, wherein an end of each protecting portion that is farther from the light-emitting element in the direction of the optical axis of the coupling lens is in a plane perpendicular to the optical axis of the coupling lens, and configured to provide a support foot portion on which the holding member is supported when the holding member is placed on a level surface with an end thereof closer to the light-emitting element facing upward.

11. The light source device according to claim 1, wherein the holding member is of a monolithic structure.

12. The light source device according to claim 1, further comprising:
 a circuit board including a driver element configured to drive the light-emitting element; and
 a shielding member having an aperture configured to restrict the beam of light having passed through the coupling lens, the shielding member being electrically connected with a grounding part provided on the circuit board.

13. The light source device according to claim 12, wherein the holding member is of an insulating material, and the shielding member is of a metal sheet.

14. The light source device according to claim 13, wherein the shielding member comprises:
 a first wall-portion having a surface opposite to the light-emitting element, the aperture being provided in the first wall; and
 a second wall portion extending along a path of the beam of light passing through the coupling lens from the first wall up to a position such that the second wall portion of the shielding member covers at least part of the light-emitting element.

15. The light source device according to claim 14, wherein the shielding member further comprises a third wall portion extending from the second wall portion of the shielding member to cover at least part of a back side of the circuit board.

16. The light source device according to claim 13, wherein the shielding member is fixed on the grounding part of the circuit board by at least one of soldering, welding, brazing, and bonding with a conductive adhesive.

17. The light source device according to claim 12, wherein the shielding member is fixed on the grounding part of the circuit board, and the circuit board is fixed via the shielding member to the holding member.

18. An optical scanner comprising:
 a light source device comprising:
  a light-emitting element;
  a coupling lens configured to condense a beam of light emitted from the light-emitting element; and
  a holding member configured to hold the light-emitting element and the coupling lens, wherein the holding member has an adherend that is opposite to a surface of the coupling lens facing toward the light-emitting element in a direction of an optical axis of the coupling lens, and part of the surface of the coupling lens facing toward the light-emitting element is bonded to the adherend of the holding member,
  wherein the holding member includes a plurality of protecting portions each of which is separate from the coupling lens in a direction perpendicular to the optical axis of the coupling lens, and protrudes downstream beyond a position of a surface of the coupling lens from which the beam of light goes out, in a direction of travel of the beam of light, adjacent protecting portions being separate to form an opening that renders a peripheral end of the coupling lens accessible, and
  wherein two or more openings formed between the adjacent protecting portions are configured to extend beyond the coupling lens to the light-emitting element side, and at least one pair of the two or more openings are disposed opposite to each other with the coupling lens positioned therebetween;
 a deflector configured to deflect a beam of light emitted from the light source device to scan a target surface with the beam of light; and
 an image forming optical system configured to cause the beam of light deflected by the deflector to focus on the target surface to form an image thereon.

* * * * *

UNITED STATES PATENT AND TRADEMARK OFFICE
CERTIFICATE OF CORRECTION

| | | |
|---|---|---|
| PATENT NO. | : 8,363,083 B2 | Page 1 of 1 |
| APPLICATION NO. | : 12/832515 | |
| DATED | : January 29, 2013 | |
| INVENTOR(S) | : Taizo Matsuura | |

It is certified that error appears in the above-identified patent and that said Letters Patent is hereby corrected as shown below:

On the Title page, item 56 under Other Publications:
    Please insert a section break between "Nov. 8, 2011" and "Office Action"

In the Claims

Column 14, Claim 16, Line 8:
    Please replace "according to claim 13," with --according to claim 12,--

Signed and Sealed this
Twenty-eighth Day of January, 2014

Michelle K. Lee
*Deputy Director of the United States Patent and Trademark Office*